May 27, 1947.  J. F. ECKSTEIN  2,421,058
APPARATUS FOR PRODUCING HEAT INSULATING HANDLES
Original Filed Dec. 4, 1939
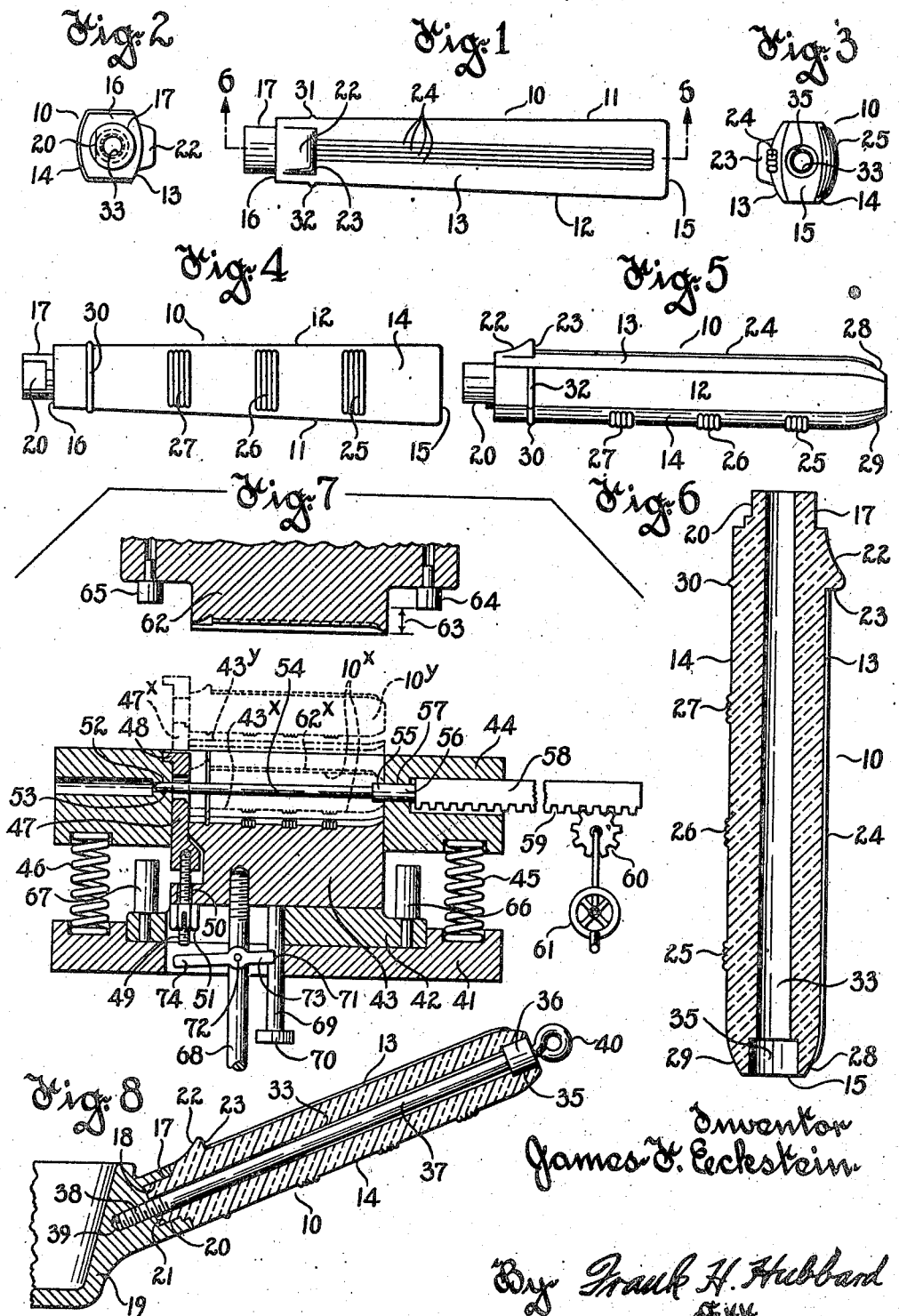
Inventor
James F. Eckstein
By Frank H. Hubbard
Attorney Patented May 27, 1947

2,421,058

UNITED STATES PATENT OFFICE 2,421,058

APPARATUS FOR PRODUCING HEAT INSULATING HANDLES

James F. Eckstein, Milwaukee, Wis., assignor to Cutler-Hammer, Inc., Milwaukee, Wis., a corporation of Delaware Continuation of application Serial No. 307,396, December 4, 1939. This application filed February 22, 1943, Serial No. 476,718

1 Claim. (Cl. 18—42)

This invention relates to improvements in apparatus for producing heat insulating handles.

There has long been a great need for a solution of the problem of providing a satisfactory heat resisting and heat insulating handle for utensils subject to heat, such as frying pans.

It has heretofore been proposed to interpose between a relatively long hollow wooden handle and the utensil a relatively short member of heat resisting and heat insulating material, but such an arrangement involved the use of an extra or added part, which increased the cost of the handle, without avoiding the objection to the relative fragility of the wooden portion of the handle and the difficulty of insuring a proper appearance of the latter, if painted or enameled, under conditions involved in its use.

It has also been proposed to form utensil handles of hot molded insulating material, thus providing satisfactory heat insulating characteristics in a one-piece handle construction. Such hot molded insulating material, however, involves a relatively higher cost of dies, material and labor, lacks the required degree of heat resistivity, and is subject to charring or carbonization, particularly at the point of attachment of the handle to the utensil or as a whole when the utensil is used as a baking pan in an oven, thus rapidly reducing the strength and marring the appearance of the handle.

Accordingly, a primary object of my invention is to provide for production of insulating handles for utensils subject to heat wherein the aforementioned disadvantages and defects of prior handles are avoided.

Another object is to provide a novel apparatus for producing handles of insulating material which will withstand the heat of a baking oven or the like without deleterious effects.

Another and more specific object of the invention is to provide a novel apparatus for producing a one-piece, cold-molded handle of hand-grip length formed of non-charring heat insulating material with a molded in passage extending longitudinally therethrough to accommodate a bolt for securing the handle to a cooking utensil.

Another object is to provide a novel apparatus for cold molding handles of the character aforementioned.

Other objects and advantages of the invention will hereinafter appear.

This application is a continuation of application, Serial No. 307,396, filed by me jointly with Henry R. Marshall and Julius W. Palen on December 4, 1939, for Heating insulating handles and a method of and apparatus for producing the same.

The accompanying drawings illustrate one form of handle produced in accordance with my invention and the preferred apparatus for cold molding the same. It is to be understood that the article and the apparatus herein disclosed are susceptible of modification in respect of certain details without departing from my invention as defined by the appended claim.

In the drawings, Figure 1 is a top plan view of a one-piece, cold molded, heat resisting and heat insulating handle produced in accordance with my invention, said handle being adapted for attachment to a frying pan or the like.

Fig. 2 is a view of one end of the handle shown in Fig. 1, the non-circularity of the reduced end portion of the handle being illustrated.

Fig. 3 is a view of the other end of the handle, the two inner circles illustrating the tapered form of the through passage, and the outer circle illustrating the countersink or recess which accommodates the enlargement or head portion of a securing bolt to be associated therewith.

Fig. 4 is a bottom plan view of the handle.

Fig. 5 is a side view of the handle.

Fig. 6 is a vertical longitudinal section, on the line 6—6 of Fig. 1, full size, illustrating the form of the through passage, the countersunk recess associated therewith, and the contour of portions of the upper and lower surfaces of the handle.

Fig. 7 is a vertical sectional view of a cold molding die set of relatively simple form which may be employed to produce a handle of the character herein disclosed, and Fig. 8 is a fragmentary sectional view of a frying pan, and illustrating the manner in which such an insulating handle may be attached thereto.

In the drawings, the numeral 10 designates a preferred form of one-piece cold molded hollow insulating handle produced in accordance with my invention. As shown by the full size view in Fig. 6, handle 10 is of sufficient length to provide for proper gripping thereof by hand. The same is provided with a pair of straight approximately parallel flat sides 11 and 12 and two opposed sides 13 and 14 of convex form in transverse cross section between the sides first mentioned. As illustrated in Figs. 1 and 4, handle 10 is somewhat wider at its outer end 15 than at its inner end 16, due to the slight inward angle of sides 11 and 12 toward each other between said outer and inner ends. The same is provided at its inner end 16 with an integral, centrally located substantially cylindrical neck or extension 17, which neck is adapted to fit snugly within a socket or recess, such as that provided at 18 in the metal frying pan 19 in Fig. 8. In practice neck 17 is provided with a flat surface 20 extending throughout at least a portion of its length for cooperation with a corresponding flat surface 21 (Fig. 8) formed in the socket 18, whereby rotation of the handle relatively to the pan is positively prevented.

Handle 10 is preferably provided on its upper convex surface 13 adjacent to the inner end thereof with an integral projection 22, the substantially vertical shoulder or surface 23 of which acts as an abutment or guard to prevent accidental contact of a user's thumb with the adjacent portion of the metal pan (see Fig. 8). The convex surface 13 of the handle is also preferably provided with a centrally located group of adjacent ribs or ridges 24 extending from the surface 23 to a point adjacent to the outer end 15 aforementioned. Said ribs 24 function to afford a better manual grip upon the handle, and at the same time provide a pleasing and attractive appearance of the upper surface of the latter.

Similarly the transversely convex lower surface 14 of said handle is provided with a plurality of longitudinally spaced groups 25, 26 and 27 of adjacent ribs or ridges extending across a portion of the width of said surface to assist in affording a good manual grip upon the handle, and to provide a pleasing and attractive appearance of the latter when the frying pan or the like is hung in reversed relation upon a wall hook or nail when not in use.

As best illustrated in Figs. 5 and 6 the upper and lower surfaces 13 and 14 are preferably curved toward each other adjacent to the outer end 15 of the handle, as indicated at 28 and 29. The aforementioned lower surface 14 is also preferably provided with a single relatively small rib or ridge 30 which meets and forms a continuation of the vertical ribs 31 and 32 formed upon the aforementioned sides 11 and 12. Said ribs 30, 31 and 32 are substantially alined with the aforementioned shoulder 23, and similarly act as abutments to assist in preventing accidental contact of the user's fingers with the adjacent portion of the metal pan.

Handle 10 is provided with a molded in bolt passage 33 extending longitudinally therethrough from end to end thereof. Said passage is preferably of circular form in transverse cross section, and the same preferably is tapered slightly toward the inner end of the handle, as best illustrated in Fig. 8. Such taper is likewise illustrated by the inner full line circle and the next adjacent dotted line circle in Fig. 2, and by the two adjacent inner circles shown in full lines in Fig. 3. Said passage 33 preferably includes a relatively large substantially cylindrical countersink or recess 35 which is concentric with said passage and opens to the outer end 15 of the handle.

Recess 35 is adapted to accommodate an enlargement or head portion 36 (Fig. 8) of a bolt 37 the shank of which penetrates said passage and has a threaded end 38 which takes into a tapped recess 39 of corresponding size provided at the inner end of the aforementioned socket 18. Upon tightening of bolt 37 the head portion 36 engages the inner end wall of countersink 35 to insure full telescopic movement of neck 17 into socket 18, and to insure retention of the handle in the assembled position thereof illustrated in Fig. 8. In practice rod 37 is provided above the head portion 36 thereof with a hook or loop portion 40 whereby the frying pan or the like may be suspended from the usual hook or nail when not in use.

The pan to which the handle is attached may be of any suitable cast metal, such as iron or aluminum (Fig. 8), or the pan may be formed of sheet metal, such as spun aluminum or the like, in which event a formed metal socket is attached to the pan in any suitable manner, as by welding or riveting, a metal nut being held captive in the socket for cooperation with the threaded end 38 of bolt 37.

Although I have illustrated a handle having the preferred shape and ornamentation, it is to be understood that the shape and ornamentation of certain portions thereof may be modified, if desired. Thus the convexity of the surfaces 13 and 14 may be varied, or even eliminated; ribs like 24 may be provided upon both surfaces 13 and 14; or ribs like 25, 26, 27 may be provided upon both of said surfaces, or said rib formations may be omitted; the only requirement being that said surfaces 13 and 14 are such as to provide for formation of the body of the handle by a straight-line molding operation.

As aforestated, to accomplish the results contemplated by me it is necessary that the handle be composed of cold molded and heat indurated insulating material having the desired heat insulating and heat resisting (or non-charring) characteristics. I have disclosed in Fig. 7 an apparatus for producing such handles in a simple and expeditious manner. The cold molding die set illustrated in Fig. 7 comprises a stationary base or bed-plate consisting of the parts 41 and 42, a lower die member 43 which rests upon the part 42 during the molding operation; a movable die box 44 which telescopically surrounds the lower die member 43 and is spring-biased upwardly to a given position relatively to the latter as by means of a plurality of relatively strong coiled compression springs, two of which are shown at 45 and 46.

The lower die member 43 has associated therewith, in slidable relationship thereto, an auxiliary die member 47 which is positively interlocked at 48 with die box 44 and adjustably interlocked with the lower die member 43 as by means of a bolt 49 having threaded engagement with the lower end portion of member 47; bolt 49 passing freely through an opening 50 provided in member 43 and having an adjustable nut 51 keyed or otherwise non-rotatably secured thereto and engageable with the lower surface of said member 43. Member 47 and its associated parts thus act to normally limit the degree of upward movement of the die box 44 with respect to die member 43 under the bias of springs 45 and 46. Any suitable means (not shown) may be provided for preventing a substantial degree of upward displacement of die box 44 from the position thereof illustrated upon upward movement of die members 43 and 47 as an incident to the ejecting operation hereinafter described.

Die box 44 thus operates with die members 43 and 47 to provide a die cavity corresponding in length and transverse dimensions to the length and transverse dimensions of the handle 10. Die box 44 is formed at opposite longitudinal ends of the die cavity, as illustrated, to accommodate with a close fit at 52 the small end 53 of a hardened steel rod or plunger the slightly tapered portion 54 of which is adapted to form the major portion of the bolt passage in the molded handle 10. Said plunger has an enlarged portion a part 55 of which extends into the die cavity to form the aforementioned countersink or recess 35 and another part 56 of which has a close sliding fit within a guide opening 57 in said die box, the openings 52 and 57 acting to insure proper positioning of the passage-forming rod with respect to the die cavity. Said rod is provided with a further enlarged portion 58 having a rack or teeth 59 formed thereon for cooperation with a gear 60, which as shown may be rotated in either direction by the hand-wheel 61 to insert said passage forming rod into or to entirely withdraw the same from operative relationship to the die cavity.

With the aforedescribed parts positioned as illustrated, the die cavity may have deposited therein a suitable charge of comminuted or granular cold moldable insulating material, such material being composed of an organic binder and a fibrous filler. Such charge may be deposited by hand to a level flush with the upper surface of the die box. In practice I prefer to employ a "shuttle" type filling device of well known form (not shown) which automatically insures charging of the material to the level aforementioned.

Thereafter the upper die member 62 is moved downwardly by any suitable power-operated means (not shown), said die member initially entering telescopically into the die box 44 to a depth corresponding to that indicated by the line 63 in Fig. 7. Such movement of die member 62 relatively to die box 44 and die member 43 effects partial compression or compacting of the material within the die cavity. Associated with die member 62 are a plurality of abutment members, two of which are shown at 64 and 65. Thus upon continued downward movement of die member 62, members 64 and 65 will engage the upper surface of die box 44 whereby the latter is constrained to move downwardly jointly with the upper die member 62, against the bias of springs 45 and 46, during the remainder of the molding operation. Part 42 of the bed-plate has associated therewith a plurality of abutment members, two of which are shown at 66 and 67, whereby the degree of joint downward movement of the upper die member 62 and die box 44 relatively to the lower die member 43 is positively limited.

As aforeindicated, the lower die member 43 remains in the position thereof illustrated in full lines during the entire molding operation. However, merely for purposes of illustration, we have shown in dotted lines at 43ˣ and 62ˣ in Fig. 7 the relative positions of the lower and upper die members with respect to rod 54 when the die members are in their final molding relationship, it being understood, of course, that in such relationship die member 62, die box 44 and rod 54 will have been moved downwardly to their lower limits, whereas die member 43 will have remained stationary in the full line position thereof illustrated.

Upon completion of the application of the usual relatively high molding pressure by operation of the die elements in the manner aforedescribed, the die member 62 is moved upwardly toward the full line position thereof illustrated, thus releasing the pressure upon the material comprising the molded handle. Thereupon the rod 53, 54, 55 is withdrawn toward the right to entirely clear the molding cavity, as by clockwise rotation of handwheel 61 with consequent movement of gear 60 and rack 59. Although I have illustrated manually operable means for effecting movement of rod 54 into and out of the operative position thereof illustrated, it is to be understood that any suitable power operated means may be employed for this purpose.

As a result of such upward movement of die member 62 springs 45, 46 will act to move die box 44, die member 47 and rod 54 upwardly to the normal full line positions thereof illustrated, thus temporarily separating the molded handle, represented by dotted lines at 10ˣ, from the lower die member 43. Upon withdrawal of said rod 53, 54, 55 from the molding cavity in the manner just described the molded handle will be retained in the dotted line position illustrated, by frictional engagement thereof with the side and end walls of the cavity, and by the positive interlocking engagement of the reduced end thereof with die member 47.

With the die box 44 restrained against movement upwardly beyond the position thereof illustrated by the aforementioned additional abutment or stop means (not shown), the lower die member 43 is moved upwardly to simultaneously contact the molded handle and the lower end of die member 47 by power driven upward movement of a rod 68. Such movement of die member 43 is continued until the molding surface thereof is adjacent to or only slightly below the upper surface of die box 44. To facilitate removal of the molded handle from the die members 43 and 47 without injury to or marring of the piece, I prefer to provide for additional upward movement of member 47, including a substantial degree of upward movement thereof relatively to member 43. Said means as shown may comprise a rod or pin 69 which is freely slidable upwardly to a predetermined extent through a guide opening provided therefor in the parts 41 and 42 of the bed plate.

Rod 69 has a head 70 which is engageable with the lower surface of part 41 of the bed-plate to limit the extent of upward movement of the former. Rod 69 is provided at a predetermined point in its length with a notch 71 and rod 68 has pivoted thereto at 72 a lever the short end 73 of which is positioned within notch 71 for driving engagement with the upper end wall of the latter. The long end 74 of said lever is adapted to underlie the lower end of the aforementioned bolt 49; the arrangement being such that during upward movement of rod 68 pin 69 moves upwardly therewith until the head 70 strikes the lower surface of said part 41, whereupon the upper end wall of notch 71 cooperates with end 73 of said lever to cause clockwise tilting thereof with respect to rod 68, with the result that the end 74 of said lever engages the bolt 49 to drive the same and its associated die member 47 upwardly to a substantial degree relatively to die member 43, as indicated at 47ˣ and at 43ʸ, respectively, thus causing the molded handle to entirely clear the die member 43 and permitting ready manual removal of the molded handle from die member 47. The handles when molded are subjected to the usual prolonged heat treatment for curing and hardening the same.

After removal of the molded handle from the die members, the latter are moved to or permitted to move to the full line positions thereof illustrated preparatory to reception of a charge of the molding material and a repetition of the aforedescribed molding operation.

I claim:

In a machine for cold molding a relatively long insulating handle having a passage extending longitudinally therethrough, in combination, a normally stationary lower die member, a movable die box surrounding said lower die member and slidable with respect thereto, said die box being normally biased upwardly to a predetermined position relatively to said lower die member to provide with the latter a relatively long horizontal cavity for reception of molding material, a metal core member extending lengthwise of said cavity and engaged with the opposite end walls of said box for support by the latter, an upper die member initially telescopically movable into said die box to a predetermined degree to effect partial compression of molding material located within said cavity, and said die box being thereafter movable jointly with said upper die member to a predetermined degree relatively to said lower die member to effect final relatively high compression of said molding material around and about said core member, said upper die member being thereafter movable in the reverse direction to effect release of the molding pressure, means for completely withdrawing said core member from said cavity, means for thereafter effecting a predetermined degree of upward movement of said lower die member to effect ejection of the molded handle from said die box, an auxiliary die member associated with said lower die member and adapted to provide a reduced neck portion at one end of the handle, and means for effecting upward movement of said auxiliary die member relatively to said lower die member to effect ejection of the handle from the latter.

JAMES F. ECKSTEIN.

REFERENCES CITED

The following references are of record in the file of this patent:

UNITED STATES PATENTS

| Number | Name | Date |
|---|---|---|
| 457,966 | Egge | Aug. 18, 1891 |
| 1,534,780 | Hansen | Apr. 21, 1925 |
| 1,692,340 | Lattin | Nov. 20, 1928 |
| 62,089 | Towers | Feb. 12, 1867 |
| 1,142,342 | McNeil | June 8, 1915 |